(12) United States Patent
Ruud et al.

(10) Patent No.: US 10,937,233 B2
(45) Date of Patent: Mar. 2, 2021

(54) GRAPHICS PROCESSING SYSTEMS

(71) Applicant: Arm Limited, Cambridge (GB)

(72) Inventors: Ole Magnus Ruud, Trondheim (NO); Frode Heggelund, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/518,677

(22) Filed: Jul. 22, 2019

(65) Prior Publication Data

US 2021/0027533 A1 Jan. 28, 2021

(51) Int. Cl.
*G06T 17/10* (2006.01)
*G06T 15/00* (2011.01)
*G06T 17/20* (2006.01)

(52) U.S. Cl.
CPC ............ *G06T 17/10* (2013.01); *G06T 15/005* (2013.01); *G06T 17/20* (2013.01); *G06T 2210/12* (2013.01)

(58) Field of Classification Search
CPC ....... G06T 15/005; G06T 17/10; G06T 17/20; G06T 2210/12
See application file for complete search history.

(56) References Cited

U.S. PATENT DOCUMENTS

2007/0165035 A1* 7/2007 Duluk, Jr. ............... G06T 15/50
345/506
2014/0354682 A1* 12/2014 Heggelund ............... G06T 1/20
345/619

* cited by examiner

*Primary Examiner* — Haixia Du
(74) *Attorney, Agent, or Firm* — Vierra Magen Marcus LLP

(57) ABSTRACT

Disclosed herein is a bounding box that can be generated for a set of one or more primitive(s) and then passed to a rasteriser circuit for use thereby when generating the graphics fragments to be processed. The bounding box generation integrates a scissor test and allows primitives for which an initial bounding box has zero intersection with a specified scissor box to be discarded, whereas for primitives whose initial bounding box does intersect the scissor box, a new bounding box can be generated for output based on the area of intersection.

20 Claims, 9 Drawing Sheets

GRAPHICS PROCESSING SYSTEMS

BACKGROUND

The technology described herein relates to computer graphics processing and in particular to the rasterisation of graphics primitives when generating a render output.

Graphics processing is normally carried out by first dividing the graphics processing (render) output to be rendered, such as a frame to be displayed, into a number of similar basic components (so-called "primitives") to allow the graphics processing operations to be more easily carried out. These "primitives" are usually in the form of simple polygons, such as triangles.

Each primitive is usually defined by and represented as a set of vertices. Each vertex for a primitive has associated with it a set of data (such as position, colour, texture and other attributes data) representing the vertex.

Before primitives and their vertices can be processed by a graphics processing pipeline, the attributes of the vertices originally defined for a given graphics processing output (e.g. draw call) are usually subjected to an initial so-called "vertex shading" operation that operates to transform the attributes for each originally defined vertex into a desired form for the subsequent graphics processing operations. This may comprise, for example, transforming the originally defined vertex position attributes from the world or user space that they are initially defined for to the screen space that the output of the graphics processing system is to be displayed in.

The graphics processing pipeline, e.g. the vertex shading stage of the graphics processing pipeline, will typically receive the vertex data, e.g. vertex position data, in a first form defined for the vertices (primitives) (e.g. a floating point form). In some arrangements the graphics processing pipeline will then convert that data from its defined form to a form to be used later on in the graphics processing pipeline (e.g. a 16.8 fixed-point coordinate form). This conversion will accordingly have the effect of "snapping" the originally defined vertex positions (e.g. in floating point form) for a given graphics processing output to the array of vertex positions (a "vertex position grid") that can be represented using the lower precision vertex position format (e.g. a 16.8 fixed-point coordinate form) which will be used when rasterising and rendering the primitives for the graphics processing output.

The converted ("snapped") vertex positions are typically then used to determine further information defining the primitives to be used by the graphics processing pipeline, such as information representing the positions of the edges of each primitive. Usually, this edge information is determined at a primitive set-up (or assembly) stage of the graphics processing pipeline. (It will be appreciated that this may either be a separate stage of the graphics processing pipeline upstream of the rasteriser, or may form part of a single rasterisation unit (along with the stage (or sub-stage) that actually performs the rasterisation). Various other arrangements would of course be possible.)

After the primitive information, e.g. edge information, is determined in the primitive set-up stage, this information is used in subsequent processing stages of the graphics processing pipeline in order, e.g., to generate a render output. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

The rasterising process thus determines the sampling points that should be used for a primitive (i.e. the (x, y) positions of the sample points to be used to represent the primitive in the render output, e.g. frame to be displayed). The rendering process then derives the data, such as red, green and blue (RGB) colour values and an "Alpha" (transparency) value, necessary to represent the primitive at the sample points (i.e. "shades" each sample point). This can involve applying textures, blending sample point data values, and so on.

The rasterisation process typically maps the primitives defining the render output to be generated to the array of sampling points which will be used to render the output, which is usually in the form of a sampling point grid.

Determining whether a primitive covers any sampling points in the sampling point grid is typically done by testing the sampling points' positions against the edges of the primitive. To do this, the graphics processing pipeline will normally use the edge information representing each of the edges of the primitive to test the sampling points' positions. For instance, the graphics processing system may derive (line) equations representing each of the edges of a primitive (e.g. using the defined vertices of the primitive), and then test the sampling points' positions using these edge equations. If a sampling point position "passes" the edge test, it is taken to be covered by the primitive. If a sampling point position "fails" the edge test, it is taken to be outside (and therefore not covered by) the primitive.

The rasterisation process is typically carried out by testing sets of one, or of more than one, sampling point. Typically respective groups of one or more sampling points of the sampling point grid being used are associated with respective regions of the render output, such as the pixels to be rendered. Accordingly, a pixel (or other suitable region of a render output) will be deemed to be covered by a primitive (and the primitive will be determined as needing to be rendered for that pixel (region)) if at least one of its associated sampling points in the sampling point grid are covered by the primitive.

For each set of sampling points found to include a sample point that is covered by the primitive in question (being tested), a discrete graphical entity usually referred to as a "fragment" on which the graphics processing operations (such as rendering) are to be carried out is then generated by the rasteriser and sent to the rest of the graphics processing pipeline (such as the renderer) for processing.

Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured (and correspondingly will represent and correspond to a "sub-region" of the render output, corresponding to the single sampling point or set of plural sampling points in question). A "fragment" is therefore effectively (has associated with it) a set of primitive data as interpolated to a given output space sample point or points of a primitive. It may also include per-primitive and other state data that is required to shade the primitive at the sample point (fragment position) in question.

Each graphics fragment (the render output sub-region (area) that the fragment represents) may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image. (It is also the case that as multiple fragments, e.g. from different overlapping primitives, at a given location may affect each other (e.g. due to transparency and/or blending), the final pixel output may depend upon plural or all fragments at that pixel location.)

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

However, there may still be inefficiencies within such graphics processing systems, especially in the rasterisation stage. Thus, the Applicants believe that there remains scope for improved techniques for processing graphics data within such graphics processing systems.

BRIEF DESCRIPTION OF THE DRAWINGS

Embodiments of the technology described herein will now be described by way of example only and with reference to the accompanying drawings, in which.

Like reference numerals are used for like elements in the drawings as appropriate.

DETAILED DESCRIPTION

Figure 1:
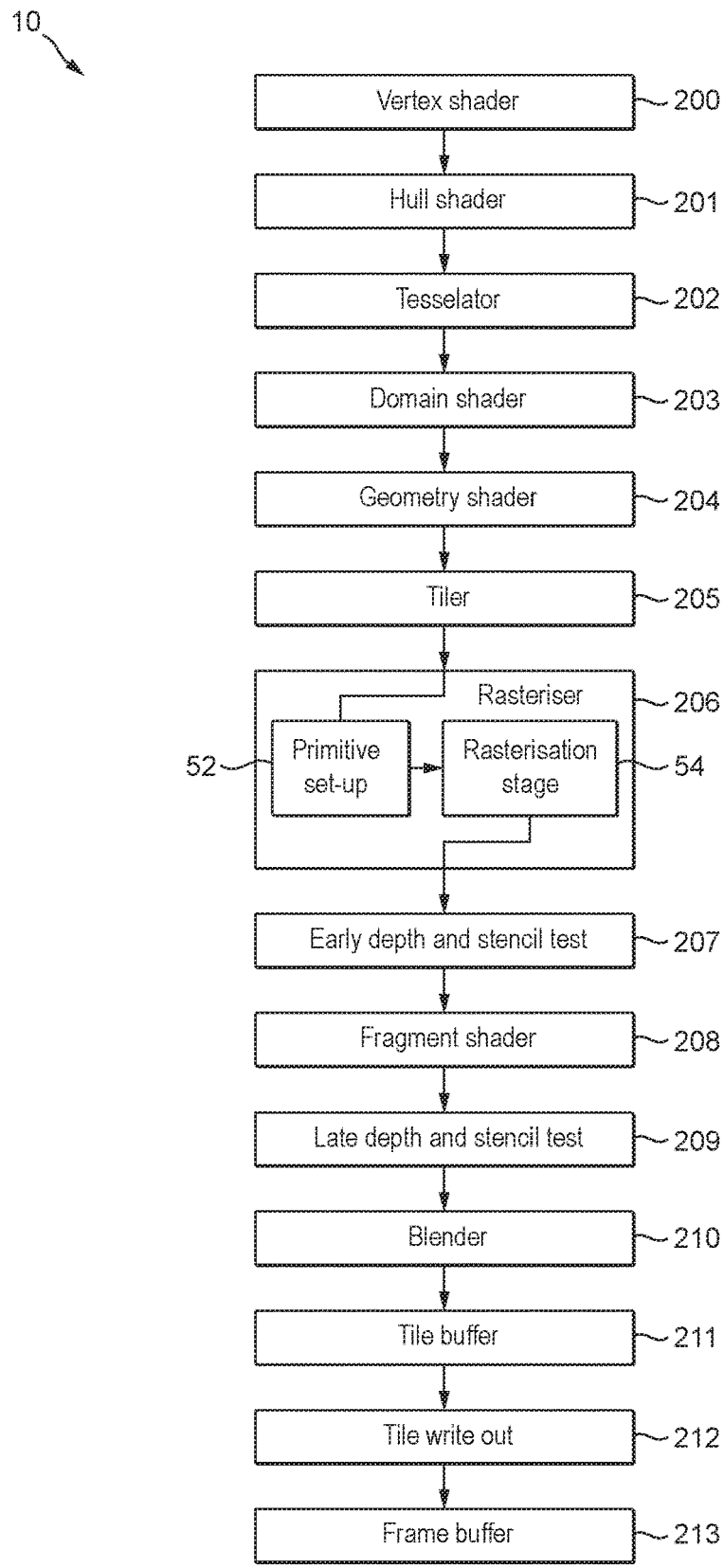
FIG. 1 illustrates schematically an exemplary graphics processing pipeline that may be executed by a graphics processor.

A first embodiment of the technology described herein comprises a method of processing graphics primitives in a graphics processor when generating a render output, the render output comprising a grid of sampling points with respective groups of one or more sampling points of the sampling point grid being associated with respective sub-regions of the render output, the graphics processor comprising:

a bounding box generating circuit;

a rasteriser circuit that rasterises input primitives to generate graphics fragments to be processed, each graphics fragment having a group of one or more sampling points associated with it; and a renderer circuit that renders fragments generated by the rasteriser circuit;

the method comprising, when processing a set of one or more primitive(s) for a render output:

obtaining a set of vertex positions for the set of primitive(s);

determining a first bounding box using the vertex positions for the set of primitive(s);

obtaining a scissor box for the render output;

determining an area of intersection between the first bounding box and the scissor box and either:

discarding the set of primitive(s), when there is zero intersection between the first bounding box and the scissor box; or when there is a non-zero intersection between the first bounding box and the scissor box, generating a second bounding box for the set of primitive(s) based on the area of intersection, and using the second bounding box when rasterising the set of primitive(s).

A second embodiment of the technology described herein comprises a graphics processor for processing graphics primitives in a graphics processor when generating a render output, the render output comprising a grid of sampling points with respective groups of one or more sampling points of the sampling point grid being associated with respective sub-regions of the render output, the graphics processor comprising:

a bounding box generating circuit;

a rasteriser circuit that rasterises input primitives to generate graphics fragments to be processed, each graphics fragment having a group of one or more sampling points associated with it; and a renderer circuit that renders fragments generated by the rasteriser circuit;

wherein the bounding box generating circuit is configured to, when processing a set of one or more primitive(s) within a render output:

obtain a set of vertex positions for the set of primitive(s);

determine a first bounding box using the vertex positions for the set of primitive(s);

obtain a scissor box for the render output;

determine an area of intersection between the first bounding box and the scissor box and either:

discard the set of primitive(s), when there is zero intersection between the first bounding box and the scissor box; or when there is a non-zero intersection between the first bounding box and the scissor box, generate a second bounding box for the set of primitive(s) based on the area of intersection, and provide the second bounding box to the rasteriser for use when rasterising the set of primitive(s).

The technology described herein generally relates to processing graphics data within a graphics processor that includes a rasteriser circuit that rasterises input primitives to generate graphics fragments to be processed, and a renderer circuit that renders fragments generated by the rasteriser to generate output fragment data. In particular, the graphics processor according to the technology described herein further includes a bounding box generating circuit that acts to generate a bounding box that can then be passed to the rasteriser circuit (along with any other desired data that may be passed to the rasteriser circuit), and used thereby during the rasterisation.

That is, in the technology described herein, prior to rasterising a primitive (or set of plural primitives) a bounding box is generated for the primitive(s). The bounding box can then be used by the rasteriser circuit when rasterising the primitive(s) to determine the pixels (or, more generally, sub-regions of the render output) for which a given primitive may need to be rendered (e.g. rather than testing the primitive's edges against all of the sub-regions of the render output to make this determination).

The use of such a bounding box in the rasteriser circuit can therefore help accelerate the rasterisation process, e.g. by reducing the need for the rasteriser circuit to test the primitive's edges against at least some of the sub-regions (since those sub-regions falling outside the bounding box need not be tested).

In particular, in the technology described herein, an initial (first) bounding box for a primitive (or set of plural primitives) is generated using the vertex positions for the primitive(s). The (first) bounding box may be generated in any suitable fashion, and may, e.g., take into account multi-sampling patterns (i.e. the (first) bounding box may be, and in an embodiment is, generated in a "sample aware" manner), conservative rasterisation, etc., as desired, as will be explained further below.

Furthermore, rather than simply providing the (first) bounding box to the rasteriser circuit, for use thereby when rasterising the associated primitive(s), the technology described herein goes on to determine a new (second) bounding box based on the intersection between the initial (first) bounding box (i.e. the bounding box that is generated for the primitive(s) using the vertex data) and a scissor box (e.g., that may be (and in an embodiment is) specified by the application using the graphics processor).

The new (second) bounding box can then be provided to the rasteriser circuit along with other data for the primitive(s) (e.g. the edge equations) and used thereby during the rasterisation, e.g. as explained above. This may provide various advantages compared to other possible approaches.

For example, in another more conventional approach, rasterisation may be performed using a combination of edge equations, (tile-relative) vertex positions, and a scissor box that has been specified by an application using the graphics processor. For example, for each rasterisation pass, the edge equations are first evaluated and then tested against the vertex positions, e.g. to eliminate coverage. Then, a scissor test is performed to cull any fragments that fall outside of the specified scissor box.

By contrast, in the technology described herein, the scissor test (and in an embodiment also the vertex position information, as will be explained further below) is integrated as part of the bounding box generation. In effect, this means that the scissor test is performed earlier than would be the case in the more conventional approach described above, prior to the rasterisation. It has been found that this may then allow for more efficient rasterisation.

In particular, combining the scissor test with the bounding box generation allows for early rejection of primitives that need not be rendered (e.g. as they fall outside of the scissor box), thereby helping accelerate the rasterisation process (i.e. by avoiding unnecessary processing of such primitives). For instance, when it is determined that there is no (i.e. zero) intersection between the (first) bounding box for a primitive and the scissor box, the primitive may be discarded at this stage, without being passed to the rasteriser, as there is no need to process that primitive further (since it falls outside the scissor box).

On the other hand, where there is (non-zero) intersection between the (first) bounding box and the scissor box, the area of intersection may then be output as the new (second) bounding box to the rasteriser and used thereby when rasterising the primitive(s). Again, this has the effect that any regions of the set of primitive(s) that fall outside the scissor box also fall outside of the new (second) bounding box, and so are not processed further (since they do not need to be processed).

Naturally, because the scissor test is integrated with the generation of the new (second) bounding box, it is not necessary to perform a scissor test again, e.g. during rasterisation (and in an embodiment this is therefore not done). Thus, the number of steps to be performed at the rasteriser can be reduced, and the rasterisation process thereby further accelerated.

This may be particularly advantageous, e.g., in the case where the rasteriser circuit is configured to perform rasterisation in a "hierarchical" manner, in which multiple iterations over different levels of subdivision of the render output area are performed in the rasteriser circuit. In the more conventional approach mentioned above, this would potentially require a scissor test to be performed at each level of subdivision within the hierarchical rasterisation process. By contrast, this can be, and in an embodiment is, avoided in the technology described herein.

Thus, by generating a bounding box in the manner described above, and then passing this bounding box to the rasteriser circuit for use during the rasterisation process, as required, it is possible to provide a more efficient rasterisation process.

The render output that is to be generated may be any suitable output that may be rendered by a graphics processor, as desired. For instance, in some embodiments, the graphics processor is part of a tile-based graphics processing system, in which case the render output may be a tile (or set of tiles) to be rendered as part of, e.g., a frame for output. In that case the tile may be subdivided into a plurality of sub-regions (e.g. pixels, or groups of pixels—such as an array of 2×2, 4×4, 8×8, 16×16, etc., pixels). However, other arrangements would of course be possible.

The render output comprises a grid of sampling points. The sampling point grid will comprise an (in an embodiment regular) array of sampling points. Respective groups of one or more sampling points will be, and are in an embodiment, each associated with a respective sub-region (area) of the graphics render output, such as, and in an embodiment, a fragment that will be generated by the rasteriser (e.g. if a sampling point of the group is covered by a primitive) (although as will be discussed below, the sub-regions that groups of one or more sampling points are associated with may be larger (or smaller) regions (areas of the render output), e.g. corresponding to plural fragments (or sub-fragments)).

It will be appreciated that any suitable sampling point pattern may be used for defining the sampling point grid. For instance, in some cases, each sub-region of the render output may be represented by a group of only one sampling point (i.e. there may be (only) a single sampling point associated with each sub-region of the render output). However, in some embodiments, a multisampling point pattern is used wherein each sub-region of the render output is represented by a respective group of plural sampling points. For example, a 2×, 4×, 8×, etc., multisampling pattern may be used. Other arrangements would of course be possible.

The technology described herein relates particularly to the processing of a set of one or more primitive(s) in a bounding box generating circuit (prior to the rasterisation of the primitive(s)).

The set of primitives that is to be processed may include only a single primitive, or the set may include plural primitives that are desired to be processed together as a single primitive "group". Once the set has been processed, the next set of primitive(s) for the render output can then be processed in the same fashion, and so on, to generate the ultimate render output. Thus, whilst embodiments will be described herein in relation to the processing of a single set of primitives, it will be appreciated that these steps will typically be repeated for all sets of primitives that are desired to be processed, e.g., in order to generate the final render output. Thus, in an embodiment, each primitive of a sequence of plural primitives for a render output is processed in the manner of the technology described herein.

In order to process a primitive (or set of plural primitives), in the technology described herein, vertex data, e.g. vertex position data, is obtained for the primitive(s). This vertex data is then used to generate an initial (first) bounding box, as will be explained below.

The vertex data may be obtained in any suitable form, and as desired, e.g. depending on how the vertex position data is stored/defined for use by the graphics processor. However, in some embodiments the vertex data, e.g. vertex position data, may be obtained in a first, higher precision ('full precision'), form defined for the vertices (primitives), e.g. a form that is not necessarily aligned with the positions of the sub-regions of the render output that is to be generated. For example, in embodiments, the vertex data may be obtained in a floating point form (e.g. 32-bit single precision floating point form).

A bounding box can then be generated for the set of primitive(s). The bounding box generally indicates which sub-regions may be covered by a primitive (and for which sub-regions the primitive(s) may therefore need to be rendered). In an embodiment, the bounding box is a, e.g., rectangle, drawn around the primitive(s). The bounding box may thus be defined in terms of four components, e.g. defining its minimum/maximum extent in the render output. It will be appreciated that a bounding box may therefore (and typically will) contain not only those areas of the render output that are at least partially covered by a primitive but also any intermediate areas required in order to complete the box (e.g. rectangle).

The bounding box thus only indicates which sub-regions (areas) contain sampling points that might need to be processed for a primitive. Thus, the sub-regions covered by the bounding box may still need to be checked in the rasteriser circuit to determine the actual fragment (primitive) coverage. However, the bounding box helps reduce the processing in the rasteriser circuit since it can be ensured that any sub-regions falling outside the bounding box are not covered by a primitive and therefore need not be tested.

A bounding box for a set of primitive(s) may be generated by simply generating a box using the vertices for the primitive(s) in the form in which they are specified, e.g. in "full precision" floating point form. In that case, the bounding box may be defined in "full precision" (e.g. floating point form), with its minimum and maximum extent defined in that form. The full precision box may thus be defined in terms of its minimum and maximum extents in floating point form, with the minimum and maximum extents being defined based on the vertices of the primitive.

To facilitate the rasterisation, the "full precision" vertex information is therefore in an embodiment converted into another form that is more suitable to be used later on in the graphics processing pipeline, e.g., and in an embodiment, a lower precision form that is aligned to the positions of the sub-regions of the render output. In embodiments rather than converting the vertex data itself into a lower precision form, and passing the converted vertex data to the rasteriser circuit, the conversion of the vertex data into an easier to use (e.g., and in an embodiment, lower precision) form is in effect accounted for and performed as part of the bounding box generation.

For instance, in an embodiment, the vertex data is initially obtained in a first form defined for the vertices, which is in an embodiment a floating point form. A (first) bounding box is in an embodiment then generated as follows. Firstly, a box is generated that encompasses all of the vertices as defined in the first form, with the box therefore being defined in the first form (i.e. a 'full precision' box), as described above. However, rather than using the full precision box, the box defined in the first form (i.e. the floating point/full precision box) is then converted into an "integer" sub-region bounding box that is aligned with the sub-regions of the render output (and thus that only contains whole (integer) sub-regions), e.g. by "snapping" the co-ordinates in the first form to the positions (i.e. corners) of the sub-regions.

Thus, in an embodiment, the vertex positions are obtained in a first form, such as floating point form, and the initial (first) bounding box is determined for a set of primitive(s) by first generating a full precision bounding box around the primitive(s) using the vertex positions in the first form, and then aligning the full precision bounding box with the sub-regions to generate a modified bounding box that contains only whole sub-regions (i.e. an integer "sub-region" bounding box, which will then be further processed in the manner described below to generate the bounding box that is passed to the rasteriser).

This arrangement thus has the effect that the vertex data for the primitive(s) is converted into an easier to use format, i.e. a sub-region aligned bounding box, that can then be passed to the rasteriser, and used thereby when rasterising the primitive(s).

In order to generate the desired render output it must be ensured that the integer sub-region bounding box generated from snapping the full precision bounding box still covers all sub-regions that a primitive could need to be rendered for.

For example, once the "full precision" bounding box has been generated for a set of one or more primitive(s), this full precision box can then be (and in some embodiments is) expanded outwardly to construct an integer sub-region bounding box that covers any and all sub-regions that are at least partially covered by the set of primitive(s). In this case the integer sub-region bounding box will cover any sub-regions that are at least partially covered by the primitive(s) (as well as any sub-regions necessary for completing the box), without taking account of whether or not the primitive actually covers any sampling points for those sub-regions. That is, the integer sub-region bounding box may be generated in a "conservative" manner without regard for the actual sampling point pattern.

However, in some embodiments, rather than simply expanding the full precision box outwards in a conservative manner, the full precision box is tested against the sampling points at least for those render output sub-regions that are only partially covered by the full precision bounding box in order to determine whether any sampling points in those sub-regions are actually covered by the full precision box. It will be appreciated that only those sub-regions that are (only) partially covered by the full precision bounding box may need to be tested in this way against the full precision box (and in an embodiment only the partially covered sub-regions are tested), since it can be ensured that the full precision bounding box will necessarily contain any sampling points for any sub-regions that are fully covered by the full precision bounding box.

The full precision box is then snapped to cover whole sub-regions based on which contain sampling points that are determined to be covered by the full precision box to generate an integer bounding box. That is, in embodiments, the sampling pattern that is being used for the render output may be accounted for when generating the integer bounding box (the (first) bounding box is generated based on, and taking account of, the sampling pattern that is being used for the render output).

Thus, in embodiments, the bounding box defined in the first form (the floating point/full precision box) may be snapped relative to the sub-regions such that the integer sub-region bounding box covers any and all sub-regions for which it is determined that the full precision box covers one or more sampling points. For instance, the (first) bounding box may be generated in such a way that a sub-region is only indicated as being covered by the primitive, and hence used to generate the integer sub-region bounding box, if the full precision bounding box (generated from the original vertex position data) actually covers a sampling point for that sub-region. Thus it can be ensured that the (first) bounding box generated in this way includes any sub-regions that are definitely covered by a primitive (although of course the bounding box only indicates possible fragment coverage, and the primitive edge testing will still have to be performed, as explained further below, during the rasterisation to determine whether the fragment sampling point is covered or not).

This also means that the rasteriser circuit in an embodiment does not need to use the full precision vertex data thereafter to check coverage, since the "full precision" vertex testing is in effect encoded in the bounding box generation. That is, the above arrangement has the effect that the full precision vertex testing need only be performed once, during the bounding box generation, but not thereafter (during the rasterisation).

Accordingly, once the (first) bounding box has been generated for a set of primitive(s), and any other primitive set-up requiring the vertex position data is complete (e.g. generating the edge equations), the vertex position data for those primitive(s) therefore need not be saved beyond this point, e.g. or passed to the rasteriser circuit (and in an embodiment therefore is discarded at this point, thereby saving storage).

Further, it will be appreciated that the step of determining whether the primitive actually covers a sampling point for a sub-region may involve a relatively complex processing operation, e.g. which must be performed with relatively fine granularity (i.e. using the full precision data, on scales smaller than the size of the sub-regions). However, another advantage of the technology described herein is that this complex operation may need only to be performed once for the set of primitive(s), i.e. when generating the (first) bounding box.

For instance, in the technology described herein, this initial (first) bounding box is then further processed to generate the new (second) bounding box which can then be passed on to the rasteriser. The rasteriser circuit is then able to determine the primitive coverage using the (second) bounding box (along with the, e.g., edge equations, if required). Because the new (second) bounding box is in an embodiment sub-region aligned, the rasteriser circuit may thus only need to perform relatively simpler operations, at sub-region granularity, when determining the coverage using the new bounding box.

Thus, again, it can be seen that at least according to some embodiments the processing requirements in the rasteriser circuit can be reduced by using a bounding box as described herein.

In another embodiment, e.g. in order to support so-called "conservative rasterisation" wherein the primitive coverage is over-estimated by design, the integer bounding box may be determined so as to cover any sub-regions that are touched by the full precision box (even if the primitive does not actually cover a sampling point in that sub-region). (It will be understood that "conservative rasterisation" is a form of rasterisation that is performed to try to take account of and to reduce the effect of, any rounding errors in the positions and dimensions of primitives that are rasterised as compared, e.g., to the positions and dimensions of the primitives as defined in and by the application that requires the graphics processing. Such errors in a primitive's dimensions can arise because, e.g., the vertex coordinates from a primitive may be converted from a floating point format to a fixed point format for the rasterisation process, etc. Various approaches for conservative rasterisation are known.)

Thus, the bounding box generation may also enable and take account of conservative rasterisation techniques. In this case, the above steps of determining the actual sampling point coverage may be disabled, and the integer bounding box may be generated by simply expanding the full precision bounding box outwardly onto an integer set of sub-regions including any and all sub-regions that are at least partially covered by the full precision bounding box (e.g. in a conservative manner as discussed above).

Thus, in embodiments, particularly in the case where conservative rasterisation is being used (is enabled), determining the first bounding box comprises generating a full precision bounding box using the vertices in their obtained first form; determining which sub-regions of the render output are at least partially covered by the full precision bounding box; and generating an integer sub-region bounding box that includes any and all sub-regions that are at least partially covered by the full precision bounding box.

Other arrangements would of course be possible, and in general the initial (first) bounding box that is generated from the vertex data for the primitives may be generated in any suitable fashion, as desired.

As mentioned above, in the technology described herein, rather than passing the initial (first) bounding box to the rasteriser circuit, the initial (first) bounding box is then intersected with a scissor box in order to generate a new (second) bounding box, e.g., that can then be passed to the rasteriser circuit, if required, and used thereby when rasterising the primitive(s). In particular, a new (second) bounding box is generated based on the area of intersection between the initial (first) bounding box and the scissor box.

For instance, it is known when rasterising primitives to perform a scissoring operation, using a so-called "scissor box", in order to cull any primitives that fall outside the defined box (a scissor test). Typically, the scissoring is performed in the rasteriser, as mentioned earlier, after the edge equations have been evaluated, and the primitive set-up has been completed, and so on. By contrast, the technology described herein in effect combines the scissoring into the bounding box generation, in a pre-rasterisation step.

Typically, the scissor box will be specified by an application using the graphics processor (and in embodiments this is the case). A scissor box will normally be specified for each render output that is to be processed. For example, a current scissor box may be stored (or obtained) by the bounding box generating circuit, and then used accordingly when generating the new (second) bounding box for that render output. Thus, whenever a new render output (e.g. a new tile) is to be processed, the scissor box may initially be reset, e.g. to the full size (area) of the render output. The current scissor box can then be updated when a new scissor box is configured (e.g. read in) that intersects the render output, and the updated scissor box can then be used accordingly when generating the (second) bounding box.

Typically the scissor box will be smaller than the area of the render output (e.g. tile), or may only partially cover the area of the render output (e.g. tile) (e.g. where the scissor box extends over multiple different render outputs (e.g. tiles) but only partially intersects one or more of the render outputs (e.g. tiles)). This means that at least some areas of the render output will fall outside the scissor box and any regions of primitives falling in such areas need not be (and in the technology described herein are not) rendered.

However, it may be that the case that the scissor box is equal to or larger than the size (area) of the render output such that the scissor box would completely cover the render output. In that case the entire area of the initial (first) bounding box will fall within the scissor box, and will thus be provided for output to the rasteriser circuit (i.e. as the (second) bounding box).

The scissor box is in an embodiment also aligned with the sub-regions of the render output. In that case, the area of intersection will also in an embodiment be aligned with the sub-regions, such that the (second) bounding box is also sub-region aligned, and therefore in a form that can more easily be handled by the rasteriser.

It would also be possible that the obtained scissor box is not sub-region aligned. However, the (second) bounding box that is passed to the rasteriser is in an embodiment still sub-region aligned. In that case, additional processing may be required when generating the (second) bounding box, e.g. by snapping either the scissor box or more in an embodiment the area of intersection to cover an integer number of sub-regions. This could be performed by simply expanding the scissor box and/or area of intersection outwardly to cover an integer number of sub-regions. However, this step could also be performed in a sample-aware manner, similarly to that described above, if desired.

For instance, if the scissor box is specified in a first form that is not sub-region aligned (e.g. a floating point form), and the area of intersection is therefore also not sub-region aligned, it may be checked which sampling points are actually covered by the area of intersection, and a sub-region aligned area of intersection may then be generated by snapping the area of intersection to an integer number of sub-regions based on and including those sub-regions for which it is determined that the area of intersection actually covers one or more sampling point(s).

Various other arrangements would of course be possible in this regard, e.g. depending on how the scissor box is defined, e.g. in the application using the graphics processor.

It is also contemplated that when generating the new (second) bounding box an intersection may be determined between not only the first bounding box and a scissor box, but also with any other suitably defined render output regions for which the rendering is to be enabled or disabled. This could then be used to account for clipping, the effective/native tile size, and so on, as desired. For example, the first bounding box could also be intersected with a defined clipping plane or planes and/or a clipping box, that has been defined for the render output (e.g. by an application using the graphics processor), in a corresponding manner to the scissor box. Similarly, the first bounding box may be intersected with the effective tile size, where this is different from (e.g. smaller than) the area of the render output in question. Other arrangements would of course be possible.

In an embodiment the bounding box generating circuit forms part of a primitive set-up circuit of the graphics processor (i.e. the stage that acts to generate the primitive data to be used for rasterisation and that may perform, e.g., steps including taking the vertex positions for a primitive and processing these to generate the primitive edges, and any other desired data, that is then passed to the rasteriser). In that case, when it is determined that there is no (zero) intersection between the initial (first) bounding box and the scissor box, any additional primitive set-up that may otherwise be required (e.g. any steps that have not yet been performed) can also be avoided.

However, other arrangements would of course be possible and in general the bounding box generating circuit may be executed at any point, e.g. in a graphics processing pipeline, prior to rasterisation.

After intersecting the (first) bounding box with the scissor box, in the manner described above, the new (second) bounding box can then be provided to the rasteriser for use thereby when rasterising the primitive(s). For instance, the rasteriser circuit in an embodiment uses the bounding box to determine which sub-regions are covered by the primitive(s), and for which sub-regions the primitive(s) might therefore need to be rendered.

The rasteriser circuit can then, as needed, proceed with the rasterisation of those (and only those) sub-regions determined to be by the bounding box, e.g. by performing primitive edge testing, etc., for those sub-regions, as will be described below.

The rasteriser circuit thus receives from the bounding box generating circuit the new (second) bounding box, along with any required primitive data (e.g. edge information), and then processes the primitives(s) accordingly, e.g. by first using the bounding box to eliminate coverage, and then testing the primitive edges against the sub-regions, as needed.

The testing of the edges of a primitive against the sampling points of the sampling point grid for the render output area can be performed in any suitable and desired manner. Thus, it can be performed in the normal manner for testing primitives' edges against sampling points in the graphics processor (graphics processing pipeline) in question.

It would be possible to test a primitive at one particular arrangement (level) of subdivision of the render output area into regions (e.g. to test at a fragment level, or a group of fragments level) only (and in some embodiments, that is what is done).

However, as mentioned above, in an embodiment the rasterisation process of the technology described herein is performed as a "hierarchical" rasterisation process in which primitives are tested against progressively smaller regions ("patches") of the graphics render output area down to a minimum region size (corresponding, in an embodiment, to single fragments), discarding any regions that are not (at least in part) determined to be covered (at least in part) by the primitive.

In an embodiment therefore, primitives can be, and are in an embodiment, tested by the rasterisation process against plural respective subdivisions of the sampling point grid, with each such grid subdivision representing a given subdivision of the render output area into a set of regions (patches) of a given size, and each different subdivision dividing the render output area into a set of regions (patches) that are different in size to the other subdivisions of the render output area.

In this case therefore, there will be a first subdivision of the sampling point grid consisting of groups of sampling points from the sampling point grid that each respectively correspond to a first subdivision of the render output area into regions (patches), and at least one other subdivision of the sampling point grid consisting of groups of sampling points from the sampling point grid that each respectively correspond to a second, different subdivision of the render output area into regions (patches) (a subdivision of the render output area into regions that are different in size to the regions (patches) of the first subdivision of the render output area).

In one such embodiment, there is one sampling point grid subdivision in which the render output area is divided into regions (patches) corresponding to individual fragments, and at least one other sampling point grid subdivision in which the render output area is divided into regions (patches) that are bigger than individual fragments (and that in an embodiment correspond to an array of plural fragments). Thus in this case, there will be one subdivision of the sampling point grid into groups of sampling points in which each group corresponds to an individual fragment, and at least one other subdivision of the sampling point grid into groups of sampling points, in which each group of sampling points corresponds to a region that is bigger than an individual fragment.

The result of the rasterisation processing for a primitive can be used as desired, e.g., and in an embodiment, depending upon the nature of the rasterisation that is being performed and the purpose of that rasterisation.

Thus, in the case of a hierarchical rasterisation operation when testing a primitive against larger regions of the render output, the result of the rasterisation processing is in an embodiment used to either discard the primitive for the region (patch) of the render output in question or to determine to subdivide the region (patch) of the render output in question into smaller regions (patches) and then test the primitive against those smaller regions (patches).

Correspondingly, when testing a primitive against the smallest (or only) subdivision (e.g. fragment subdivision) of the render output area, in an embodiment the result of the rasterisation testing is used to generate (or not) appropriate fragments for further processing (e.g. rendering) of the primitive in respect of the region (patch) of the render output area in question.

It will be appreciated that the technology described herein may be especially advantageous in the context of hierarchical rasterisation operations, wherein the rasterisation is performed over a number of different hierarchical subdivision levels, since the technology described herein allows the number of processing steps required during rasterisation to be reduced (e.g. at least by integrating the scissor test into the bounding box generation step). By contrast, in other more conventional approaches any steps performed by the rasteriser circuit, such as a scissor test, may need to be performed at each level in the hierarchy.

Furthermore, the technology described herein also allows for additional optimisation for such hierarchical rasterisation processes.

For instance, as explained above, in a hierarchical rasteriser, coverage is determined by a process of hierarchical subdivision, with multiple passes being performed at progressively smaller (sub) regions (patches) until fragment coverage is found. Using the new (second) bounding box generated according to the technology described herein, the coverage in a region (patch) can in many cases (e.g. especially for relatively small primitives) be determined without having to perform the computationally expensive edge equations and without any loss in accuracy.

For instance, when only one region (patch) (at a particular level) is covered by the bounding box, partial coverage of the region (patch) is guaranteed, and it can also be guaranteed that the region (patch) is not fully covered. This information may then be used to accelerate the rasterisation.

For example, if it can be seen based on the bounding box that only one (out of four) of the regions (patches) being tested is covered, the edge testing for that region (patch) can be skipped since it can be seen immediately determined that the region (patch) is (only) partially covered. The processing can thus move to the next hierarchical level to determine the coverage.

On the other hand, if two or three (or all) of the regions (patches) being tested are covered, the edges should then be (and in an embodiment are) tested in the usual fashion to determine the coverage at that level before moving to the next hierarchical level.

If zero edges are covered the region (patch) can of course be discarded in the usual manner.

At the final hierarchical level (i.e. at the smallest region (patch) size that is being tested) the sampling point edge coverage can then be checked, and the appropriate fragments generated and output accordingly, e.g. for rendering.

As well as the bounding box generating circuit, and rasteriser circuit, the graphics processor should (and in an embodiment) include other processing circuits (and execute other processing stages) that are required to generate the required render output, such as, and in an embodiment, a renderer (renderer circuit). It may also include any other units, circuits, and stages that are normally present in graphics processors and graphics processing pipelines, such as tile (and other) buffers, a writeback circuit, and so on.

The renderer (circuit) of the graphics processor should be operable to render (shade), graphics fragments it receives from the rasteriser circuit to generate the desired output graphics fragment data. It may contain any suitable and desired rendering elements and may be configured in any suitable and desired manner. Thus, for example, it may comprise a fixed function rendering pipeline, including one or more fixed function rendering circuits (stages), such as texture mappers, blenders, fogging units, and the like. In an embodiment the renderer comprises a fragment shader (a shader pipeline) (i.e. a programmable renderer circuit that is operable to and that can be programmed to carry out fragment shading programs on fragments in order to render them).

As will be appreciated by those skilled in the art, the renderer will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile buffer (as will be the case in a tile-based graphics processing system).

The graphics processor may also comprise, and in an embodiment does also comprise, and/or is in communication with, one or more memories and/or memory devices that store the data described herein, such as the primitive data, the bounding box data, the fragment data, etc., and/or that store software for performing the processes described herein. The graphics processor may also be in communication with a host microprocessor, and/or with a display for displaying images based on the data generated by the graphics processor.

The technology described herein can be used irrespective of the form of output that the graphics processor may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processor is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements, and processing stages of the technology described herein may comprise a suitable processor or processors, controller or controllers, functional units, circuits, circuitry, processing logic, microprocessor arrangements, etc., that are operable to perform the various functions, etc., such as appropriately configured dedicated hardware elements or processing circuits/circuitry and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

The technology described herein is applicable to any suitable form or configuration of graphics processing system, graphics processor, and renderer. The graphics processor in an embodiment executes a graphics processing pipeline that can contain any suitable and desired processing stages, etc. that a graphics processing pipeline may normally include. The technology described herein is particularly applicable to tile-based graphics processors and graphics processing systems. Thus, in an embodiment, the graphics processing system is a tile-based graphics processor.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), or any other suitable system.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline 10 that may be executed by a graphics processor. The graphics processing pipeline 10 shown in FIG. 1 is a tile-based system, and will thus produce tiles of a render output data array, such as an output frame to be generated. (The technology described herein is equally applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 1 shows the main elements and pipeline stages of the graphics processing pipeline. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. Equally, some of the elements depicted in FIG. 1 need not be provided, and FIG. 1 merely shows one example of a graphics processing pipeline 10. It will also be appreciated that each of the stages, elements and units, etc., of the graphics processing pipeline as shown in FIG. 1 may be implemented as desired and will accordingly comprise, e.g., appropriate circuits and/or processing logic, etc., for performing the necessary operation and functions.

The graphics processing pipeline as illustrated in FIG. 1 will be executed on and implemented by an appropriate graphics processing unit (GPU) (graphics processor) that includes the necessary functional units, processing circuits, etc., operable to execute the graphics processing pipeline stages.

In order to control a graphics processor (graphics processing unit) that is implementing a graphics processing pipeline to perform the desired graphics processing operations, the graphics processor will typically receive commands and data from a driver, e.g. executing on a host processor, that indicates to the graphics processor the operations that it is to carry out and the data to be used for those operations.

Figure 2:
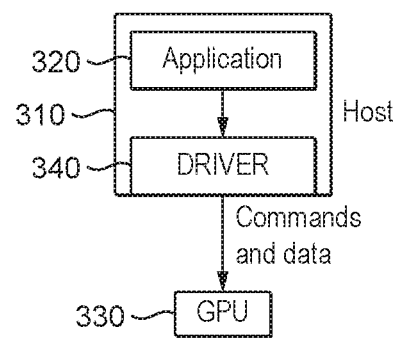
FIG. 2 illustrates schematically a typical computer graphics processing system.

Accordingly, as shown in FIG. 2 (which shows a typical computer graphics processing system), an application 320, such as a game, executing on a host processor 310 that requires graphics processing operations to be performed by an associated graphics processing unit (executing a graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320. To facilitate this, a set of instructions will be provided to the graphics processor 330 in response to instructions from the application 320 running on the host system 310 for graphics output (e.g. to generate a frame to be displayed).

The graphics processing pipeline 10 shown in FIG. 1 includes a number of stages (circuits), including vertex shader 200, a hull shader 201, a tesselator 202, a domain shader 203, a geometry shader 204, a tiler 205, a rasterisation stage 206, an early Z (depth) and stencil test stage 207, a renderer in the form of a fragment shading stage 208, a late Z (depth) and stencil test stage 209, a blending stage 210, a tile buffer 211 and a downsampling and writeout (multisample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline 10.

For a given output to be generated by the graphics processing pipeline there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

The hull shader 201 performs operations on sets of patch control points and generates additional data known as patch constants. The tessellation stage 202 subdivides geometry to create higher-order representations of the hull, and the domain shader 203 performs operations on vertices output by the tessellation stage (similar to a vertex shader). The geometry shader 204 may (if run) generate primitives such as a triangles, points or lines for processing.

Once all the primitives to be rendered have been appropriately processed, e.g. transformed, and/or, e.g., generated by the geometry shader, the tiler 205 then determines which primitives need to be processed for each tile that the render output has been divided into for processing purposes. To do this, the tiler 205 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the primitive tile lists (lists of primitives to be processed for each tile), then each tile can be rendered.

To do this, each tile is processed by the graphics processing pipeline stages shown in FIG. 1 that follow the tiler 205.

Thus, when a given tile is being processed, each primitive that is to be processed for that tile (that is listed in a tile list for that tile) is passed to the rasteriser 206.

The rasterisation stage 206 of the graphics processing pipeline 10 operates to rasterise the primitives into individual graphics fragments for processing.

To do this, the rasteriser 206, particularly a primitive set-up stage 52 of the rasteriser 206, operates to determine, from the vertex shaded vertices provided to the primitive set-up stage 52, edge information representing each primitive edge of a primitive to be rasterised. This edge information is then passed to a rasterisation stage 54 of the rasteriser 206, which rasterises the primitive to sampling points and generates graphics fragments having appropriate positions (representing appropriate sampling positions) for rendering the primitive.

(It will be appreciated that although FIG. 1 shows the primitive set-up stage 52 being part of a single rasterisation unit (the rasteriser 206 of FIG. 1), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader).

There is then a "late" fragment Z and stencil test stage 209, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late fragment test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

Figure 3:
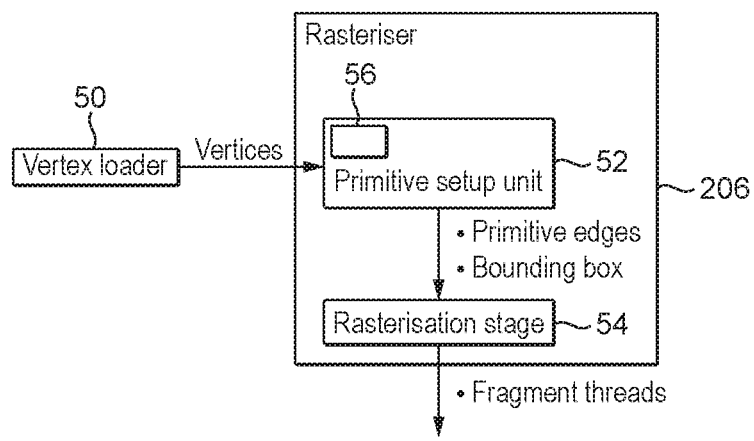
FIG. 3 shows a high level data flow between the basic components of a graphics processing pipeline that may be executed by a graphics processor according to embodiments of the technology described herein.

The present embodiments relate particularly to the operations performed in the rasteriser 206. FIG. 3 thus shows a high level data flow to and from the rasteriser 206 according to embodiments of the technology described herein.

In particular, the rasteriser 206 includes a primitive set-up circuit 52 that acts to receive vertex position data from a vertex loader 50. The primitive set-up circuit 52 includes a bounding box generating circuit 56 that takes the vertex position data for a primitive (or set of plural primitives) and uses this to generate a bounding box for the primitive(s) which is then passed into the rasterisation stage 54 for rasterisation, along with any other data for the primitive(s), such as the edge equations, that may be needed for the rasterisation.

The generation of the bounding box according to the present embodiments will now be described with reference to FIG. 4.

Figure 4:
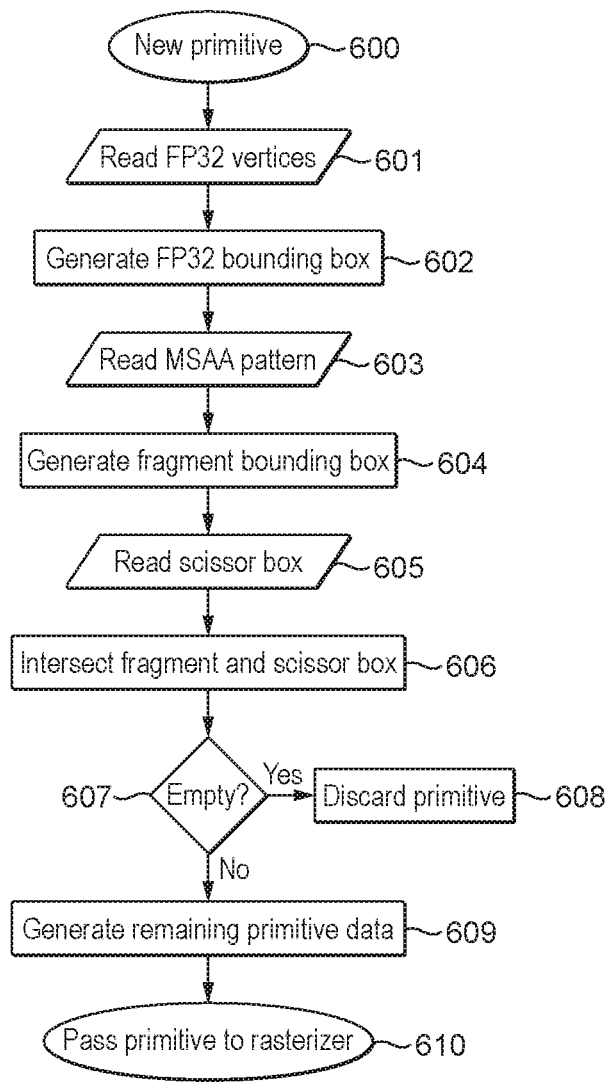
FIG. 4 is a flow chart showing the generation of a bounding box according to embodiments.

FIG. 4 is a flow chart showing the generation of the bounding box by the bounding box generating circuit 56 in the primitive set-up circuit 52.

When a new primitive (or set of plural primitives) is to be processed (step 600) for a render output, such as a tile, the vertices for the primitive(s) are first read in (step 601), e.g. from the vertex loader 50.

In the present embodiments, the vertices are read in (601) in a 'full precision' floating point (e.g. 32-bit floating point) form. A full precision bounding box is then generated from the floating point vertex positions (step 602), e.g. by drawing a suitable box around the vertex positions. It will be appreciated that this box is therefore defined in the full precision form, and is not therefore aligned with the fragments (or pixels) of the tile.

The full precision box may thus be a rectangle defined in terms of its minimum/maximum extent, e.g. in the x and y directions, in the floating point form. The full precision bounding box thus completely contains the primitive(s).

In order to convert this "full precision" bounding box into a form that is easier for the rasteriser to handle, a fragment-aligned bounding box is then generated (step 604), e.g. by snapping the full precision box to an integer number of fragments. At this stage, an initial (first) bounding box is thus generated that is aligned with the fragments in the tile.

The fragment-aligned bounding box could be generated by simply expanding the full precision box outwardly to construct an integer bounding box. It will be appreciated that this approach may enable conservation rasterisation since any fragment that is at least partially covered by the full precision box will then be included into the integer bounding box.

However, in some embodiments, the fragment-aligned bounding box is generated in a sample-aware manner. Thus, optionally, before generating the fragment-aligned bounding box (604), the sampling pattern, which is in an embodiment a multi sampling anti-aliasing sampling pattern, is read in (step 603). It can then be determined which fragments contain sampling points that are actually covered by the full precision bounding box, and the fragment-aligned bounding box can then be generated accordingly, i.e. by snapping the full precision box onto any such fragments.

A scissor box, e.g. as specified by an application using the graphics processing pipeline 10, is then read in (step 605), and intersected with the initial (first) fragment-aligned bounding box (generated at step 604).

If the area of intersection is empty (i.e. there is no intersection) (step 607—'Yes'), the primitive(s) are then discarded at this stage (step 608), without being passed to the rasteriser. The primitive set-up circuit 54 can then move onto the next set of one or more primitive(s), and process this in substantially the same manner.

On the other hand, where the intersection is not empty (607—'No'), the remaining data for the primitive (e.g. the edge information) is then generated (step 609), and the primitive is passed to the rasteriser (step 610). In this case, the area of intersection between the scissor box and the (first) fragment bounding box is used as a new (second) bounding box that is also provided to the rasteriser 54 along with the primitive data, and used thereby, in a manner that will be explained further below.

Various examples of bounding box generation will now be described with reference to FIGS. 5 through 11.

Figure 5:
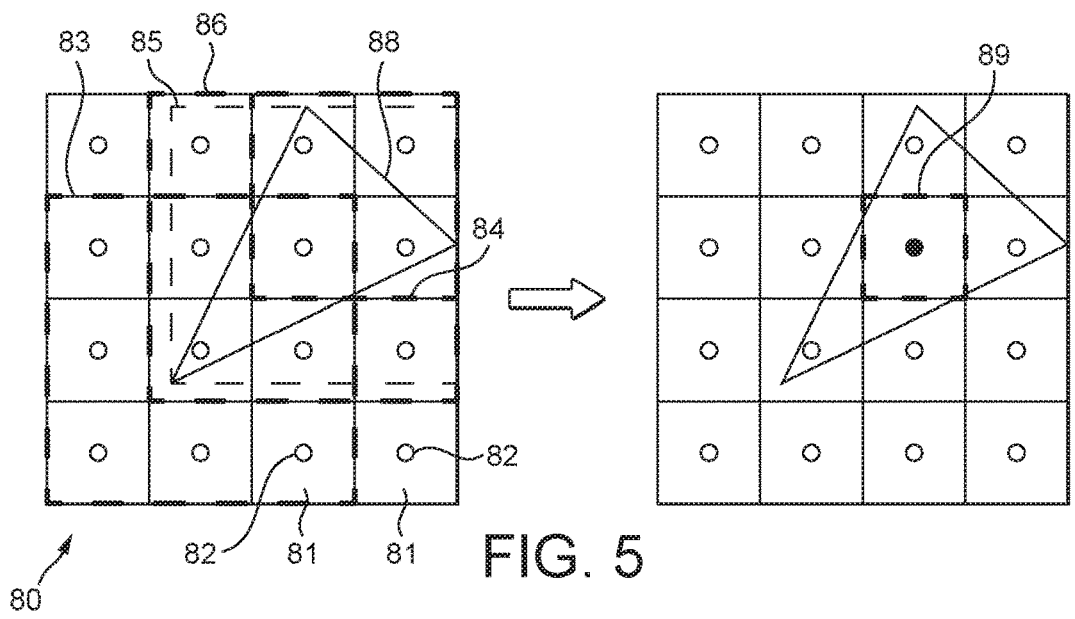
FIG. 5 shows an example of how a bounding box may be generated in embodiments by intersecting the effective tile size, scissor box and the primitive bounding box.

FIG. 5 shows an example of a render output, e.g. a tile 80, comprising a 4×4 array of fragments 81 each being associated with a respective sampling point 82. The tile 80 contains a single primitive 88 that is to be processed.

The primitive 88 is defined in floating point form. Thus, in order to generate the new (second) bounding box for the primitive 88, a full precision bounding box 85 is first drawn around the primitive 88 (step 602). In FIG. 5, this full precision bounding box 85 is then snapped outwardly to generate a fragment-aligned bounding box 86 (step 604).

FIG. 5 also shows a scissor box 83 that is specified for the render output and the effective tile size 84 for the graphics processing pipeline 10, which is this embodiment is smaller than the area of the render output 80 (i.e. the native tile size).

The integer fragment bounding box 86 is then intersected with the scissor box 83 and the effective tile size 84 in order to generate a new bounding box 89 representing the region of the primitive, which in this example is only a single fragment, that actually needs to be rendered (since the other regions of the primitive either fall outside of the scissor box 83 or the effective tile size 84). The new bounding box 89 can thus be provided to the rasteriser and used thereby when generating the required fragments, and so on, in the manner described below.

Figure 6:
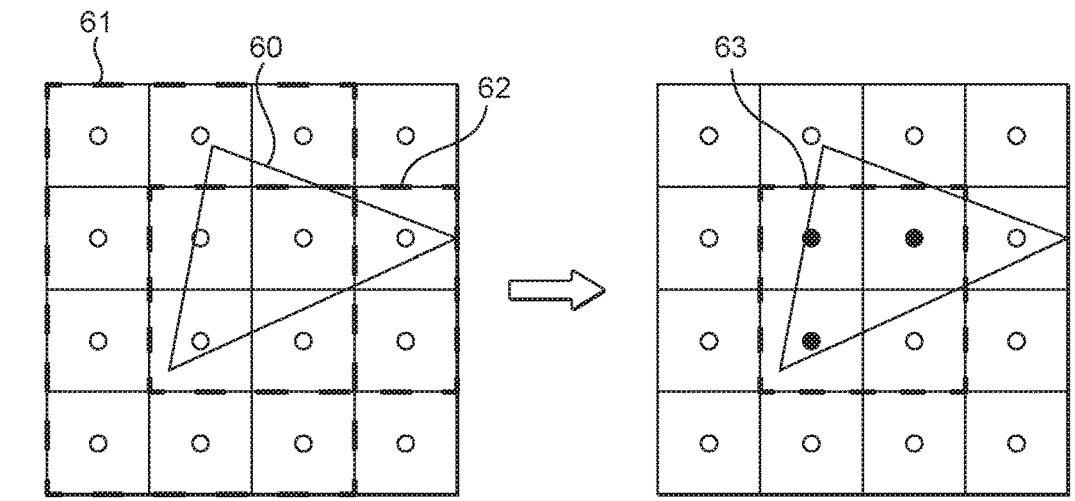
FIG. 6 shows an example illustrating the sample awareness of the bounding box according to embodiments.

FIG. 6 shows another example that illustrates generating the integer fragment bounding box in a "sample aware" manner. FIG. 6 shows the same render output, e.g. tile 80, of FIG. 5, but with a different (new) primitive 60 to be processed. As shown in FIG. 6, an integer fragment bounding box 62 is generated for the primitive 60 that contains any and all fragments for which the primitive 60 actually covers a sampling point. Any sub-regions that are partially covered by the primitive 60, but wherein the primitive 60 does not cover a sampling point, however, need not be included in the first integer fragment bounding box 62.

Again, the integer fragment bounding box 62 is then intersected with a specified scissor box 61 in order to generate a new bounding box 63 including the fragments containing sampling points that need to be rendered for the primitive 60 in question.

Figure 7:
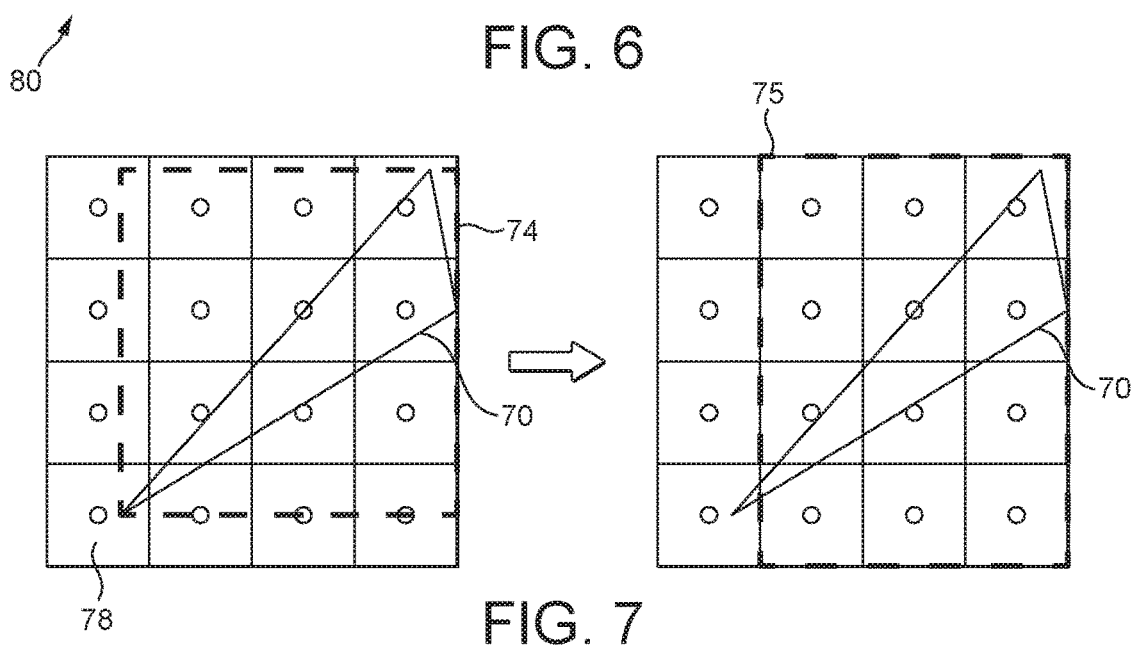
FIG. 7 illustrates how a sample aware integer fragment bounding box may be generated using the full precision bounding box.

FIG. 7 illustrates how a sample aware integer fragment bounding box (of the type that is used in FIG. 6) may be generated using the full precision bounding box for a primitive.

As shown in FIG. 7, a full precision box 74 is first drawn around the vertices of the primitive 70. It is then determined which fragment sampling points are actually covered by the full precision box 74 and only those fragments containing sampling points that are covered need be included into the integer fragment bounding box 75. For instance, the fragment 78 in the bottom left corner of FIG. 7 is partially intersected by the primitive 70. However, the full precision bounding box 74 does not cover the sampling point in that fragment 78. That fragment 78 will not be rendered and does not need to be processed by the rasteriser. Thus, the full precision box 74 is snapped inwardly on its left hand side to generate the integer fragment box 75.

Figure 8:
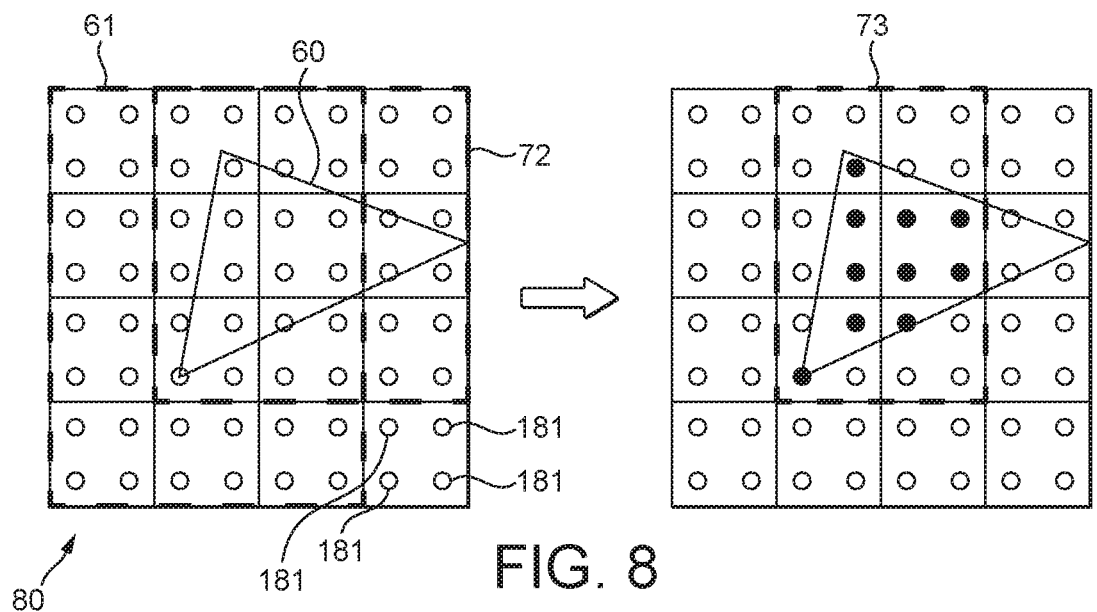
FIG. 8 shows an example of a bounding box for the same exemplary primitive of FIG. 6 but with a 4× multisampling anti-aliasing (MSAA) sampling pattern.

FIG. 8 shows the same exemplary primitive 60 as depicted in FIG. 6 but now with a 4× multisampling anti-aliasing (MSAA) sampling pattern such that each fragment 81 of the render output, e.g. tile 80, includes a set of four sampling points 181. In this case, the integer bounding box 72 now covers a greater number of fragments than in the FIG. 6 example, since the primitive 60 covers additional sampling points 181 in the sampling point grid. Similarly, when the new bounding box 73 generated by intersecting the fragment bounding box 72 with the scissor box 61 now contains two additional sub-regions.

Figure 9:
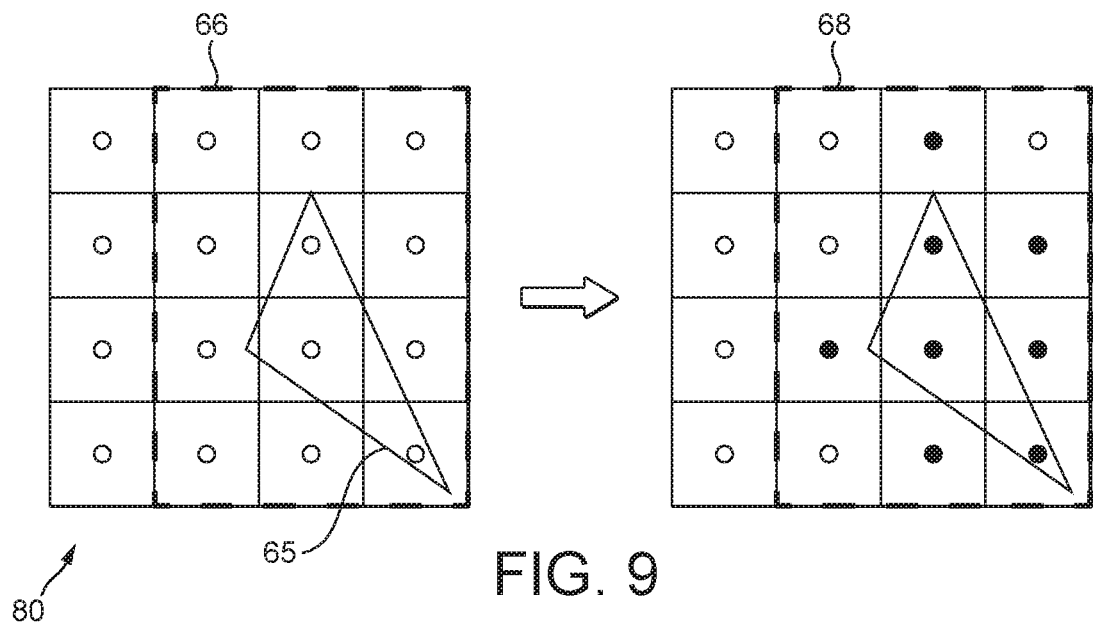
FIG. 9 shows an example of generating the new bounding box suitable for conservative rasterisation.

In some cases, rather than taking account of the sampling point grid, as is done in FIGS. 6, 7 and 8, an integer bounding box may be generated conservatively such that the integer bounding box covers any fragments (sub-regions) that are at least partially covered by the primitive (regardless of whether the primitive actually covers any sampling points). An example of this is shown in FIG. 9 wherein a fragment bounding box 66 is generated conservatively around a primitive 65.

Figure 10:
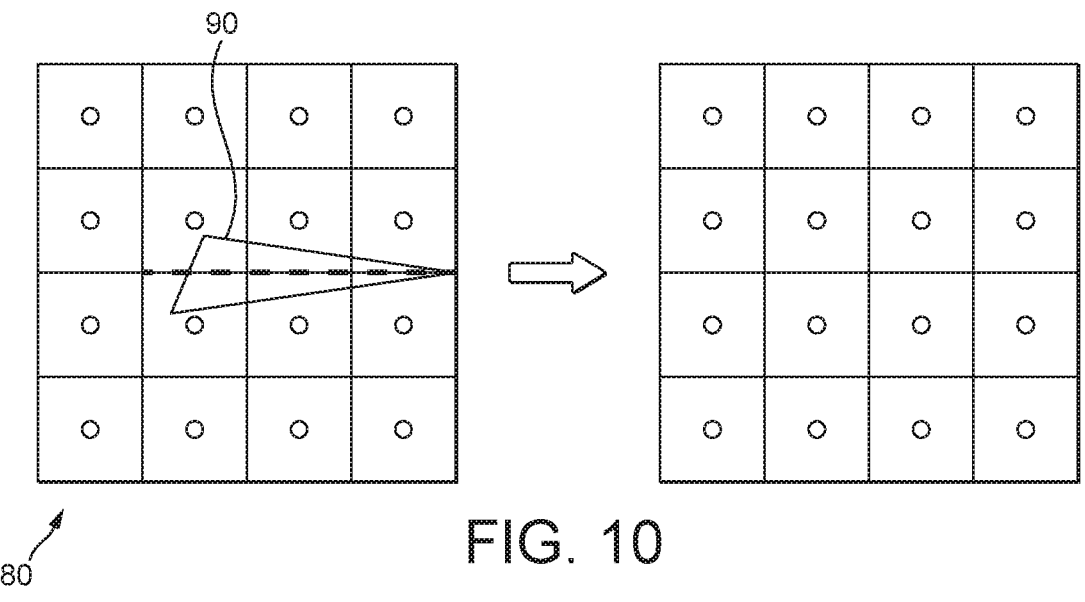
FIG. 10 shows an example of how a sample aware bounding box may result in early discard of the primitive.
Figure 11:
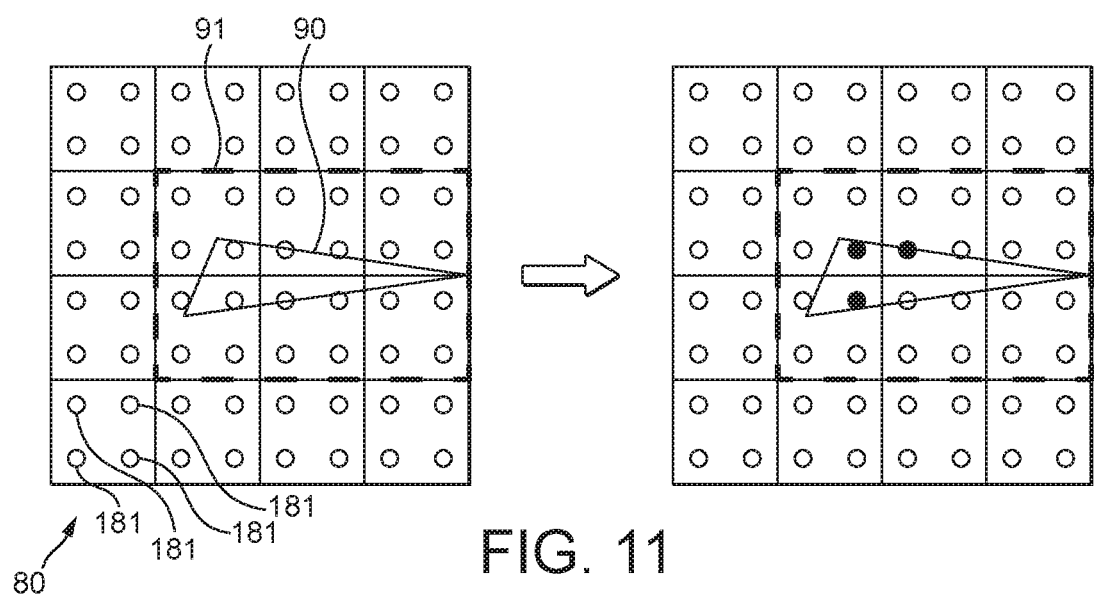
FIG. 11 shows the processing of the same exemplary primitive in FIG. 10 but now with a 4×MSAA sampling pattern, such that the primitive is now visible.

FIG. 10 shows an example of how a bounding box that is generated in a sample aware manner, as in FIG. 7, may result in early discard of the primitive. In this case it is determined that the primitive 90 does not cover any sampling points, and so a zero bounding box is generated. The primitive 90 is thus discarded and not passed to the rasteriser. The same primitive 90 is illustrated in FIG. 11 but now with a 4×MSAA sampling pattern 181, such that a non-zero fragment bounding box 91 is now generated and the primitive 90 is visible.

Figure 12:
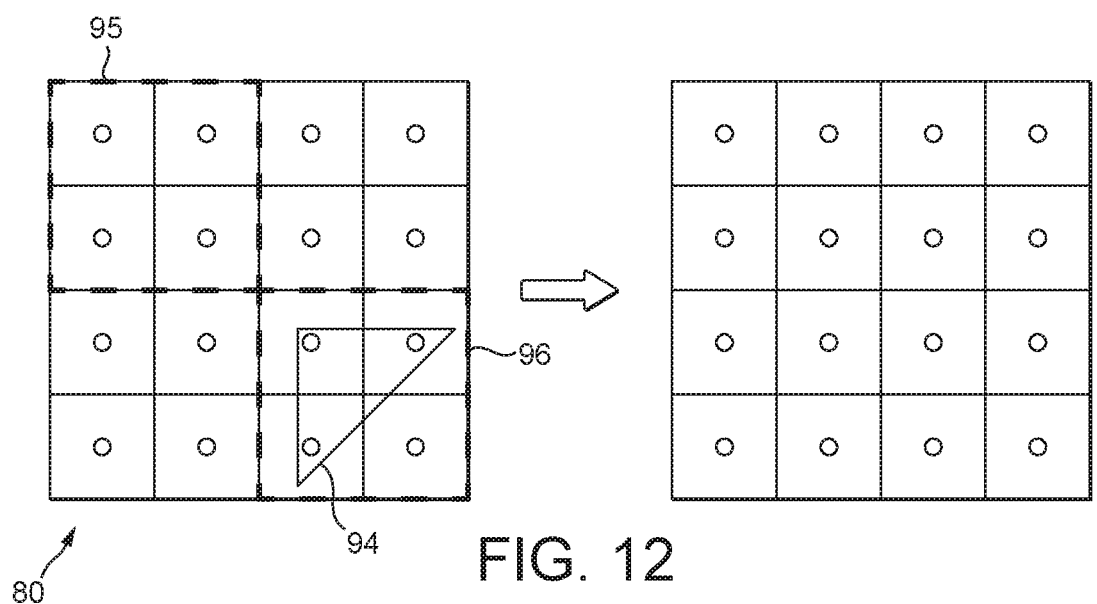
FIG. 12 shows an example where there is no overlap between the scissor box and primitive bounding box, resulting in early discarding of the primitive.

FIG. 12 shows an example where there is no overlap between the scissor box 95 and the fragment bounding box 96, again resulting in early discarding of the primitive 94.

Various other arrangements would of course be possible.

Figure 13:
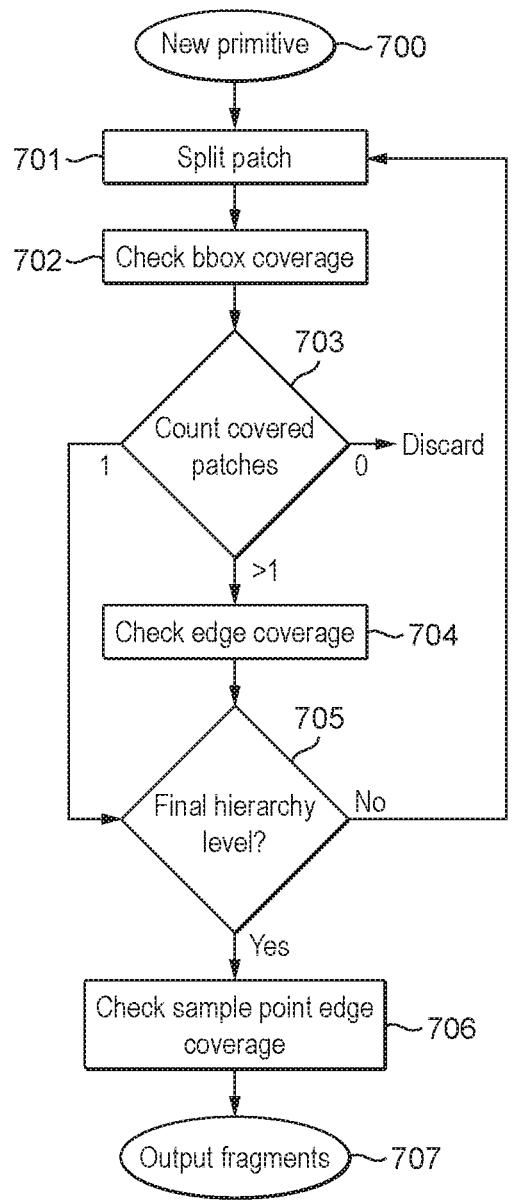
FIG. 13 is a flow chart showing how the bounding box may be used in the rasteriser according to embodiments.

The use of the bounding box in the rasteriser according to the present embodiments will now be described with reference to the flow chart in FIG. 13.

In the present embodiments, the rasteriser 206 is a hierarchical rasteriser that operates to iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation stage 54 of the rasteriser 206 performs this render output patch testing. To do this, it starts with a large patch of the render output (the render target) area and tests the patch against the primitive in question to determine if the primitive at least partially covers any patch of a 2×2 set of smaller patches of the render output (the render target area) that the large patch is divided into (encompasses).

Thus, when the rasterisation stage 54 receives a new primitive, and an associated bounding box, from the primitive set-up circuit 52 (step 700), the rasterisation stage 54 first splits the patch into its set of smaller patches (which in this embodiment will be a 2×2 set of smaller patches) (step 701).

The smaller patch coverage is then checked using the bounding box (step 702), e.g. by counting the number of smaller patches that are covered by the bounding box (step 703).

If the bounding box does not cover any patches (703—'0'), the primitive can then be discarded at this point. That is, if it is found based on the bounding box that the large patch is not covered by the primitive at all, then the patch is not processed further in respect of the primitive in question (i.e. the entire patch is discarded for the primitive in question), and another (the next) large patch is tested against the primitive, and so on.

On the other hand, if a primitive is found to at least partially cover any of the smaller patches of the set of plural smaller patches of the render output that the large patch encompasses (is divided into) (i.e. the primitive is found to cover, at least in part, the large patch), the primitive is processed further, depending upon how many smaller patches are covered.

If the bounding box covers two or more smaller patches (703—'>1'), the coverage for those patches is then checked (step 704) using the primitives edges in the usual manner before moving to the next hierarchical level. The edges of the primitive are represented by appropriate line (edge) equations that have been derived from the vertices of the primitive and are tested against a grid of sampling points derived for the patch (and for each patch) being tested. The patch sampling points are used with the line equations representing the edges of the primitive in question to perform an edge test for the edges to determine if the patch is at least partially covered by the primitive.

However, if the bounding box covers only a single smaller patch (703—'1'), in that case it can be immediately recognised that the patch is (only) partially covered, and so there is no need to check the edge coverage for that patch. The processing can then move directly to the next hierarchical level. The bounding box can therefore further accelerate the rasterisation in this way.

The processing then moves to the next hierarchical (step 705—'No') and repeats the above processing, with each patch being subdivided into smaller (sub) patches (step 701) which are then processed accordingly, until the final hierarchical level is reached (705—'Yes').

Thus, the patch testing and discarding or subdivision is continued until the minimum patch size is reached, at the final hierarchical level. Once the minimum patch size has been reached (i.e. a patch of 2×2 fragments that is covered, at least in part, by the primitive has been identified), the rasterisation stage 54 then tests the individual sampling points in that final patch using the primitive's edges to see if the sampling points are covered by the primitive (step 706). The rasteriser 206 then generates and outputs individual fragments for rendering (step 707) corresponding to the sampling points found to be covered by the primitive (so four fragments if all the 2×2 fragments in the minimum size patch are at least partially covered by the primitive).

The rasteriser 206 may also, e.g., associate with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, the rasterisation process takes each largest-size patch to be tested against a primitive in turn, and sub-divides that patch and then tests the relevant smaller patches (sub-patches) within that largest-size patch, and so on, until all sub-division and testing for that largest-size patch has been completed.

Once this is done, the rasterisation process then moves on to the next first level, largest size patch, and tests that patch, and so on, until all the first level, largest size patches that the primitive is to be tested against have been tested. Other arrangements would, of course, be possible.

In the present embodiment, each primitive to be rasterised is tested against each first level (larger size) patch of the render output that falls within (is covered by) a bounding box generated for the primitive. Other arrangements would, of course, be possible.

Once all the highest level, largest size patches of the render output have been tested against a primitive (and subdivided or discarded, as appropriate), then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

Figure 14:
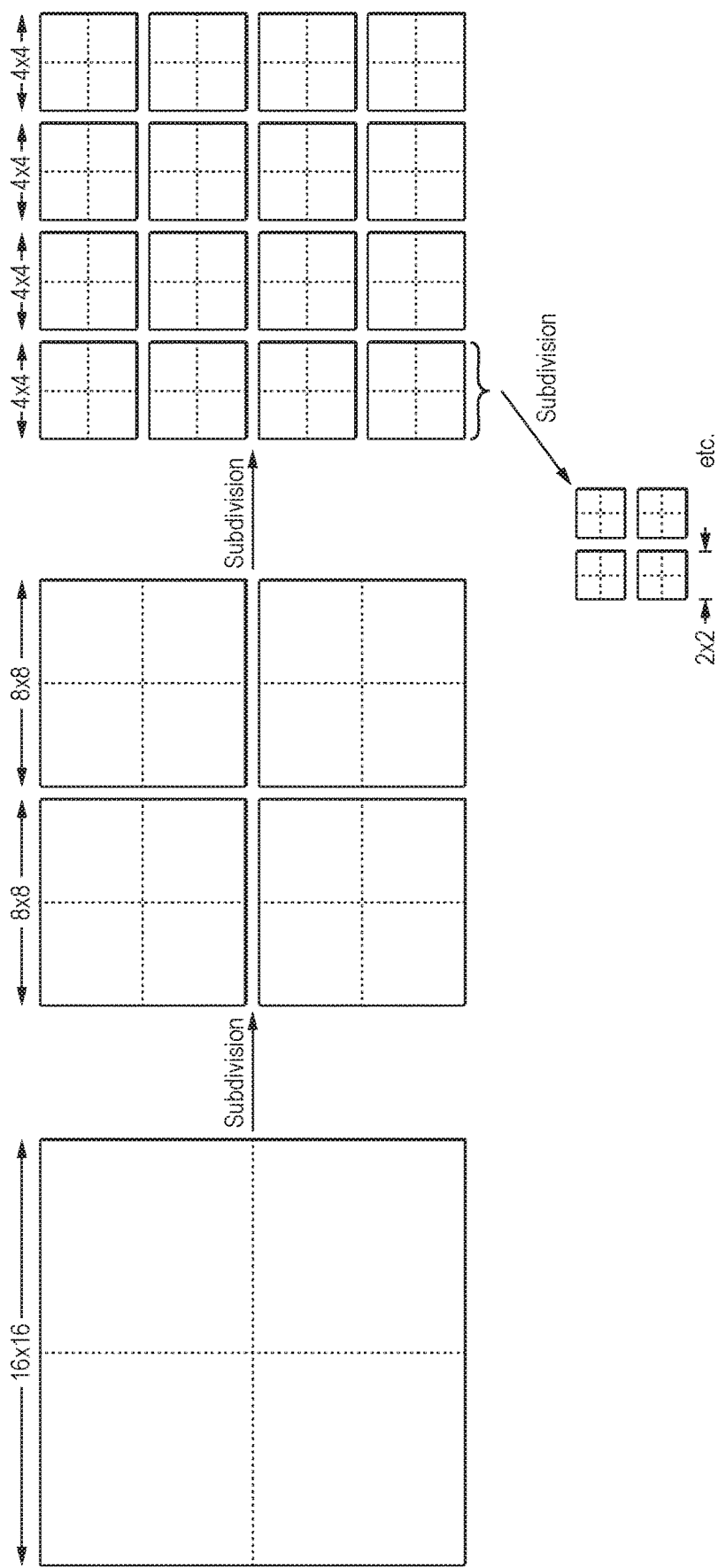
FIG. 14 illustrates the sub-division process that is used by the rasteriser in the described embodiment.

FIG. 14 illustrates the subdivision process and shows a top level, 16×16 fragment, patch being progressively subdivided down to the minimum patch size of 2×2 fragments. The embodiment of FIG. 14 thus supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Although embodiments of the technology described herein have primarily been described above with regard to the rasterisation of a single primitive to be processed by the graphics processing pipeline, as discussed, this process should be repeated for each primitive that the graphics processing pipeline receives for processing. Thus, in the case of a tile-based graphics processing system, the above rasterisation process will be repeated for each primitive that is to be processed to generate a given output tile of a rendered target to be generated by the graphics processing pipeline, and then when a given tile has been completed, performed again for the next tile and so on, until all the tiles necessary to generate the desired render output, such as a frame for display, have been processed. The process will then be repeated for the next render output (e.g. frame for display), and so on.

Thus, whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing graphics primitives in a graphics processor when generating a render output, the render output comprising a grid of sampling points with respective groups of one or more sampling points of the sampling point grid being associated with respective sub-regions of the render output, the graphics processor comprising:
   a bounding box generating circuit;
   a rasteriser circuit that rasterises input primitives to generate graphics fragments to be processed, each graphics fragment having a group of one or more sampling points associated with it; and
   a renderer circuit that renders fragments generated by the rasteriser circuit,
   the method comprising, when processing a set of one or more primitive(s) for a render output:
   obtaining a set of vertex positions for the set of primitive(s);
   determining a first bounding box using the vertex positions for the set of primitive(s);
   obtaining a scissor box for the render output;
   determining an area of intersection between the first bounding box and the scissor box and either:
   discarding the set of primitive(s), when there is zero intersection between the first bounding box and the scissor box; or
   when there is a non-zero intersection between the first bounding box and the scissor box, generating a second bounding box for the set of primitive(s) based on the area of intersection, and using the second bounding box when rasterising the set of primitive(s);
   wherein the vertex positions are obtained in a first form and wherein the first bounding box is determined by first generating a full precision bounding box using the vertex positions in the first form, and then aligning the full precision bounding box with the sub-regions to generate a first bounding box that contains only whole sub-regions.

2. The method of claim 1, wherein the first form in which the vertex positions are obtained is a floating point format.

3. The method of claim 1, wherein determining the first bounding box comprises generating a full precision bounding box using the vertices in the first form; determining at least for any sub-regions that are partially covered by the full precision bounding box whether any sampling points are covered by the full precision bounding box; and generating an integer bounding box based on and including any and all sub-regions containing sampling points that are determined to be covered by the full precision bounding box.

4. The method of claim 1, wherein determining the first bounding box comprises generating a full precision bounding box around the vertices in the first form; determining which sub-regions of the render output are at least in part covered by the full precision bounding box; and generating an integer bounding box that includes any and all sub-regions that are at least partially covered by the full precision bounding box.

5. The method of claim 1, wherein the rasteriser circuit is configured to perform a hierarchical rasterisation process in which primitives are tested at multiple hierarchical levels by progressively subdividing the render output into smaller patches down to a minimum patch size, and determining the patch coverage at each level.

6. The method of claim 5, comprising determining the patch coverage at each level using the second bounding box.

7. The method of claim 6, further comprising, when it is determined that the bounding box does not cover any patches being tested at a particular level, discarding those patches.

8. The method of claim 6, further comprising, when it is determined that more than one patch being tested at a particular level is covered by the second bounding box, checking the primitive edge coverage for those patches.

9. The method of claim 6, further comprising, when it is determined that only one patch being tested at a particular level is covered by the second bounding box, moving directly to the next hierarchical level without checking the primitive edge coverage for the patch.

10. The method of claim 1, wherein the graphics processor is a tile-based graphics processor, wherein the render output is a tile to be processed and wherein the sub-regions are sets of one or more fragment(s).

11. A non-transitory computer readable storage medium storing software code that when executing on a graphics processor comprising:
    a bounding box generating circuit;
    a rasteriser circuit that rasterises input primitives to generate graphics fragments to be processed, each graphics fragment having a group of one or more sampling points associated with it; and
    a renderer circuit that renders fragments generated by the rasteriser circuit,
    performs a method of processing graphics primitives in the graphics processor when generating a render output, the render output comprising a grid of sampling points with respective groups of one or more sampling points of the sampling point grid being associated with respective sub-regions of the render output, the method comprising, when processing a set of one or more primitive(s) for a render output:

obtaining a set of vertex positions for the set of primitive(s);

determining a first bounding box using the vertex positions for the set of primitive(s);

obtaining a scissor box for the render output determining an area of intersection between the first bounding box and the scissor box and either:

discarding the set of primitive(s), when there is zero intersection between the first bounding box and the scissor box; or when there is a non-zero intersection between the first bounding box and the scissor box, generating a second bounding box for the set of primitive(s) based on the area of intersection, and using the second bounding box when rasterising the set of primitive(s);

wherein the vertex positions are obtained in a first form and wherein the first bounding box is determined by first generating a full precision bounding box using the vertex positions in the first form, and then aligning the full precision bounding box with the sub-regions to generate a first bounding box that contains only whole sub-regions as claimed in claim 1.

12. A graphics processor for processing graphics primitives in a graphics processor when generating a render output, the render output comprising a grid of sampling points with respective groups of one or more sampling points of the sampling point grid being associated with respective sub-regions of the render output, the graphics processor comprising:

a bounding box generating circuit;

a rasteriser circuit that rasterises input primitives to generate graphics fragments to be processed, each graphics fragment having a group of one or more sampling points associated with it; and a renderer circuit that renders fragments generated by the rasteriser circuit;

wherein the bounding box generating circuit is configured to, when processing a set of one or more primitive(s) within a render output:

obtain a set of vertex positions for the set of primitive(s);

determine a first bounding box using the vertex positions for the set of primitive(s);

obtain a scissor box for the render output;

determine an area of intersection between the first bounding box and the scissor box and either:

discard the set of primitive(s), when there is zero intersection between the first bounding box and the scissor box; or when there is a non-zero intersection between the first bounding box and the scissor box, generate a second bounding box for the set of primitive(s) based on the area of intersection, and provide the second bounding box to the rasteriser for use when rasterising the set of primitive(s);

wherein the vertex positions are obtained in a first form and wherein the bounding box generating circuitry is configured to generate the first bounding box by first generating a full precision bounding box using the vertex positions in the first form, and then aligning the full precision bounding box with the sub-regions to generate a first bounding box that contains only whole sub-regions.

13. The graphics processor of claim 12, wherein the first form in which the vertex positions are obtained is a floating point format.

14. The graphics processor of claim 12, wherein the bounding box generating circuitry is configured to determine the first bounding box by generating a full precision bounding box using the vertices in the first form; determining at least for any sub-regions that are partially covered by the full precision bounding box whether any sampling points are covered by the full precision bounding box; and generating an integer bounding box based on and including any and all sub-regions containing sampling points that are determined to be covered by the full precision bounding box.

15. The graphics processor of claim 12, wherein the bounding box generating circuitry is configured to determine the first bounding box by generating a full precision bounding box around the vertices in the first form; determining which sub-regions of the render output are at least in part covered by the full precision bounding box; and generating an integer bounding box that includes any and all sub-regions that are at least partially covered by the full precision bounding box.

16. The graphics processor of claim 12, wherein the rasteriser circuit is configured to perform a hierarchical rasterisation process in which primitives are tested at multiple hierarchical levels by progressively subdividing the render output into smaller patches down to a minimum patch size, and determining the patch coverage at each level.

17. The graphics processor of claim 16, wherein the rasteriser circuit uses the second bounding box to determine the patch coverage, and wherein, when it is determined that the bounding box does not cover any patches being tested at a particular level, those patches are discarded.

18. The graphics processor of claim 16, wherein the rasteriser circuit is configured to, when it is determined that more than one patch being tested at a particular level is covered by the second bounding box, check the primitive edge coverage for those patches.

19. The graphics processor of claim 16, wherein the rasteriser circuit is configured to, when it is determined that only one patch being tested at a particular level is covered by the second bounding box, moving directly to the next hierarchical level without checking the primitive edge coverage for the patch.

20. The graphics processor of claim 12, being a tile-based graphics processor, wherein the render output is a tile to be processed and wherein the sub-regions are sets of one or more fragment(s).

* * * * *

UNITED STATES PATENT AND TRADEMARK OFFICE
CERTIFICATE OF CORRECTION

PATENT NO. : 10,937,233 B2
APPLICATION NO. : 16/518677
DATED : March 2, 2021
INVENTOR(S) : Ruud et al.

It is certified that error appears in the above-identified patent and that said Letters Patent is hereby corrected as shown below:

In the Claims

Column 27, Line 10, please change "output determining" to -- output; determining --.

Column 27, Line 27, please change "sub-regions as claimed in claim 1" to -- sub-regions --.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*